United States Patent [19]

Long et al.

[11] Patent Number: 4,498,583
[45] Date of Patent: Feb. 12, 1985

[54] DISKETTE STORAGE CONTAINER FOR STORING A LARGE QUANTITY OF DISKETTES

[75] Inventors: Jerry M. Long, Pleasanton; James A. Womack, Los Gatos, both of Calif.

[73] Assignee: Innovative Concepts, Inc., San Jose, Calif.

[21] Appl. No.: 528,398

[22] Filed: Sep. 1, 1983

Related U.S. Application Data

[63] Continuation-in-part of Ser. No. 502,188, Jun. 8, 1983.

[51] Int. Cl.$^3$ .............................................. B65D 85/30
[52] U.S. Cl. .................................. 206/444; 206/425; 220/338
[58] Field of Search ............... 220/334, 338, 340, 341, 220/342; 206/444, 45.18, 45.15, 45.23, 45.13, 425 X

[56] References Cited

U.S. PATENT DOCUMENTS

| | | | |
|---|---|---|---|
| 3,315,796 | 4/1967 | Dreyfuss | 220/338 |
| 3,370,701 | 2/1968 | Van Acker et al. | 206/425 |
| 3,392,820 | 7/1968 | Azim | 220/338 |
| 4,164,309 | 8/1979 | Staats | 206/425 |
| 4,396,119 | 8/1983 | Giulie | 206/425 |
| 4,397,389 | 8/1983 | Findeisen | 220/338 |

*Primary Examiner*—Joseph Man-Fu Moy
*Attorney, Agent, or Firm*—Hamrick, Hoffman, Guillot & Kazubowski

[57] ABSTRACT

A diskette storage container is formed of molded plastic parts which are pivotally connected together. A substantially rectangular base member has upwardly rising side walls, and cams having cam apertures adjacent the side walls. A cover member is pivotally connected to the base so that the rear edge of the cover passes into the base and rests at a slightly obtuse angle against the cams. A diskette support member is pivotally mounted to said cover and includes camming surfaces which ride on said cams as the cover is rotated toward its open position. The pivotal connection is disposed rearwardly of the centroid of the diskette support member. A notch in said camming surface is positioned to engage the cams when the cover is fully opened. This allows the diskette support member to drop forward a predetermined distance which improves accessibility to the diskettes. A locking arrangement includes a locking arm near the forward edge of the camming surfaces for engagement with the cam apertures when the container is closed. The locking arrangement includes a latch mechanism that engages with a slot in the diskette support member and a key rotated bolt is positioned so as to hold the latch in the locked position.

In an alternate embodiment, the closure member, base member and diskette support members are formed to provide a double width container in which two parallel sets of diskettes may be stored in a side-by-side arrangement.

23 Claims, 14 Drawing Figures

DISKETTE STORAGE CONTAINER FOR STORING A LARGE QUANTITY OF DISKETTES

CROSS-REFERENCE TO RELATED APPLICATION

This application is a continuation-in-part of Applicant's co-pending application Ser. No. 502,188, filed June 8, 1983.

BACKGROUND OF THE INVENTION

1. Field of the Invention

This invention relates generally to storage containers for magnetic storage diskettes of the floppy diskette type and more particularly, to a molded storage container which can be locked in the closed position and which provides separator compartments for classification and filing of the diskettes stored within.

2. Description of the Prior Art

Numerous configurations of diskette container devices are provided in the prior art. Among such devices are those disclosed in U.S. Pat. No. Des.251,273, issued March 6, 1979, to R. A. Egly, and in U.S. Design Application Sn. 080,417, filed Oct. 1, 1979, by Jerry M. Long, et al., and commonly owned herewith. The problems with most such devices are that whereas they are designed to be primarily oriented toward storage, they do not provide easy access to the word processor operator, or where they are designed to provide easy access to the functional user, they are too bulky for convenient storage and they require a design which is complicated to manufacture. Further, such containers do not include dividers or separator elements having side walls to prevent or restrict transverse movement of the diskettes within the enclosure. Nor do they provide simple but effective means for locking the container in the closed position so as to prevent casual tampering.

SUMMARY OF THE PRESENT INVENTION

It is an object of this invention to provide a storage container for a large number of magnetic storage devices such as floppy diskettes.

It is another object of this invention to provide compartmentalized diskette storage which permits separated stacking of diskettes of related subject matter to facilitate storage and retrieval.

It is also an object of this invention to provide a diskette storage container having locking means to prevent casual access to the contents stored in the storage container.

Briefly, the invention comprises a substantially rectangular base member including a bottom and upwardly extending front, back, left and right side walls with pivot apertures formed in the rear top portion of each side wall. A cam means is formed on the interior bottom surface adjacent to each side wall. The rear part of each cam means is located at a position forward of the plane of the pivot means, and the front of the cam means is open and forms a receptacle for accepting a locking tab. A closure member provides a lid for the storage container and includes pivot pins formed in downward extending side walls thereof for pivotal engagement with the pivot apertures formed in the side walls of the base member. A diskette support member includes a tray portion formed therein for supporting diskettes and separator elements. The rear portion of the tray has a V-shaped depression adapted to accept the ends of a separator holder which includes guide rails and guide slots that are adpated to align the separator elements. The separator elements have a tray section for supporting the diskettes and side walls which mate with corresponding side walls of adjacent separator elements to form separate compartments.

IN THE DRAWING

DETAILED DESCRIPTION OF THE PREFERRED EMBODIMENT

Figure 1:
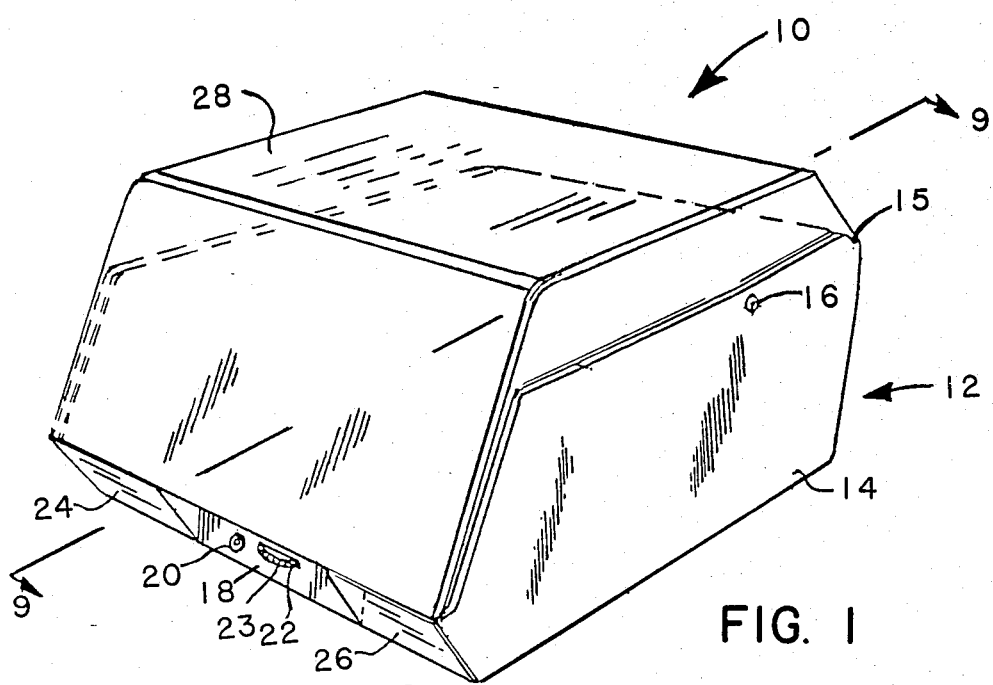
FIG. 1 is a perspective view of an improved diskette storage container in accordance with the present invention shown in its closed configuration.

Referring now to FIG. 1, a single wide diskette storage container 10 in accordance with the present invention is shown in its closed position. Certain features of the diskette storage container 10 are evident in that a base member 12 includes a pair of upwardly extending side walls illustrated at 14, and a back wall 15 which is of a height that is slightly less than the side walls. Pivot apertures shown at 16 are located in the side walls adjacent to the top edge. The height of the front wall is substantially less than that of the side or back walls, and the portions 24 and 26 slope outwardly from the bottom of the base. A front wall 18 that is substantially verticle with respect to the bottom of the base forms a recess and includes an opening in which a lock cylinder 20 is mounted and a slot 22 in which a thumb wheel latch 23 is disposed. These elements will be described in more detail later.

Figure 2:
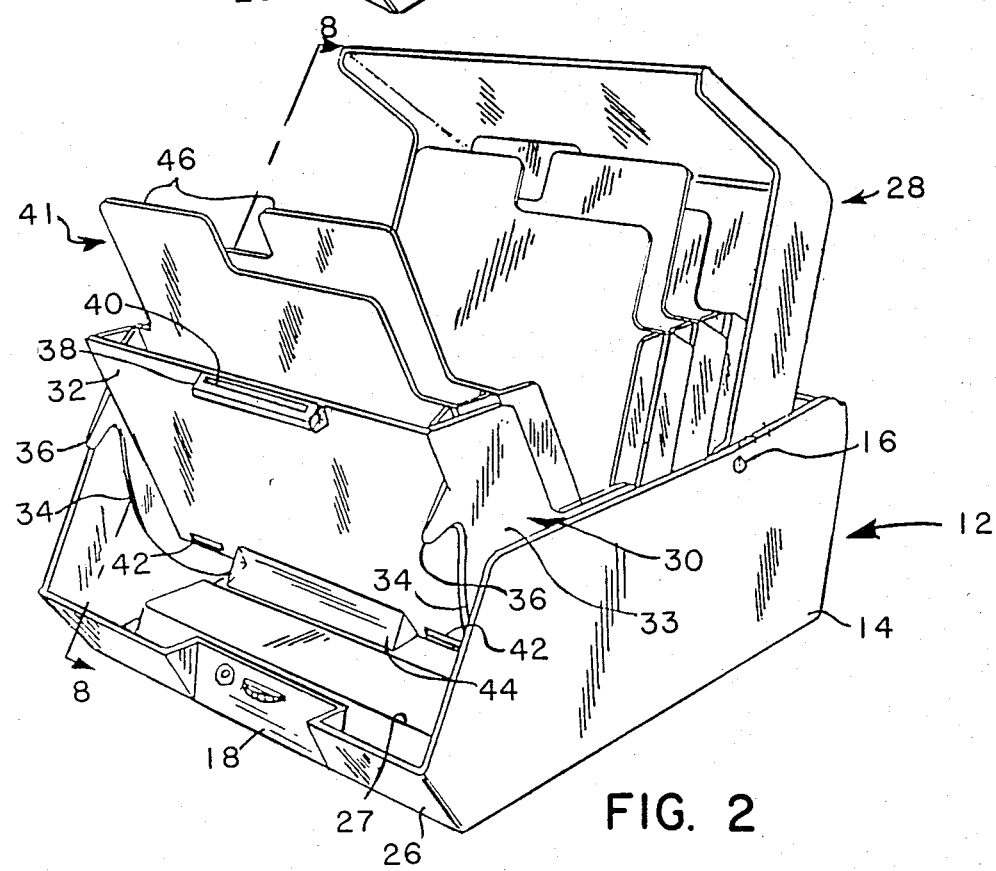
FIG. 2 is a perspective view thereof showing the container in its opened configuration.

Referring now to FIG. 2, the diskette storage container of FIG. 1 is shown in its open position. Here the diskette support member 30 may be seen, and it should be noted that it forms a cradle-like structure for the support of diskettes (not shown) and a plurality of dividers 31. A flat tray portion 32 slopes forwardly and the side walls 33 extend rearwardly. The side walls 33 also extend downwardly forming camming surfaces 34 which terminate at the forward ends thereof in locking tabs 36. At the upward edge of the tray is a molded extension 38 formed in the lower surface thereof and which includes a locking slot 40. The function of slot 40 is discussed in more detail below. Tab slots 42 and a V-shaped depression 44 are provided to accept the tabs 49 and guide rails 62 (FIGS. 5 and 6) respectively, of a holding member 60 as will be discussed in more detail subsequently.

Figure 3:
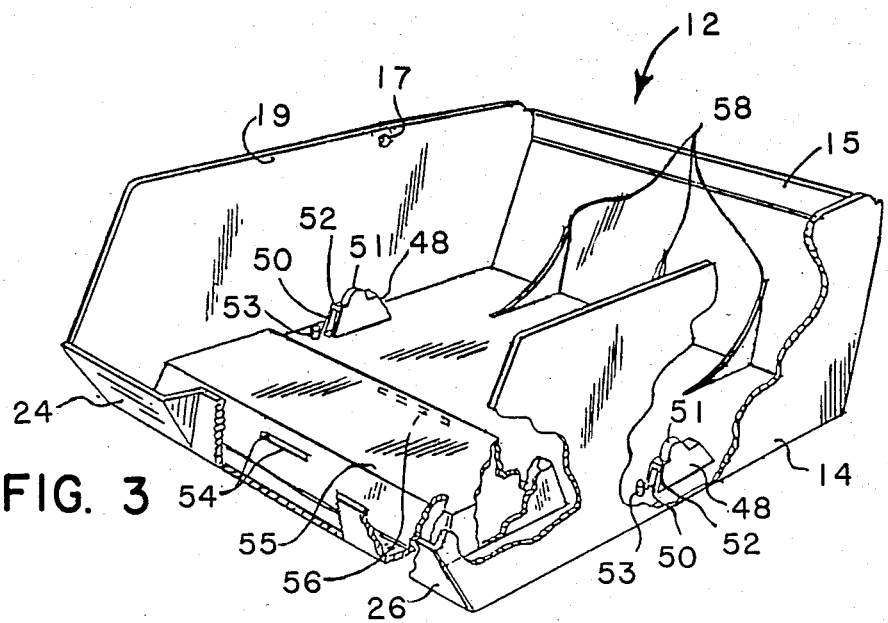
FIG. 3 is a partially broken perspective view showing the base member thereof.

Referring now to FIG. 3, the base member 12 is shown in more detail in the partially broken drawing thereof. The interior of left side wall 15 and the pivot aperture 17 formed therein are shown in detail. A generally rectangular raised portion 27 formed in the bottom of base member 12 is more clearly illustrated and is provided with a pair of latching slots 54 and 56 through which the thumb wheel 24 (FIG. 1) extends as shown and described below.

A pair of cam members 48 are shown positioned adjacent the side walls 14 and 15 and each cam member includes a camming surface 51 and an open face 50 forming a receptacle for receiving the locking tabs 36 of diskette support member 30 (FIG. 2). The rear interior of the base is configured to include three support ribs 58 which serve to stiffen the rear wall 15.

Figure 4:
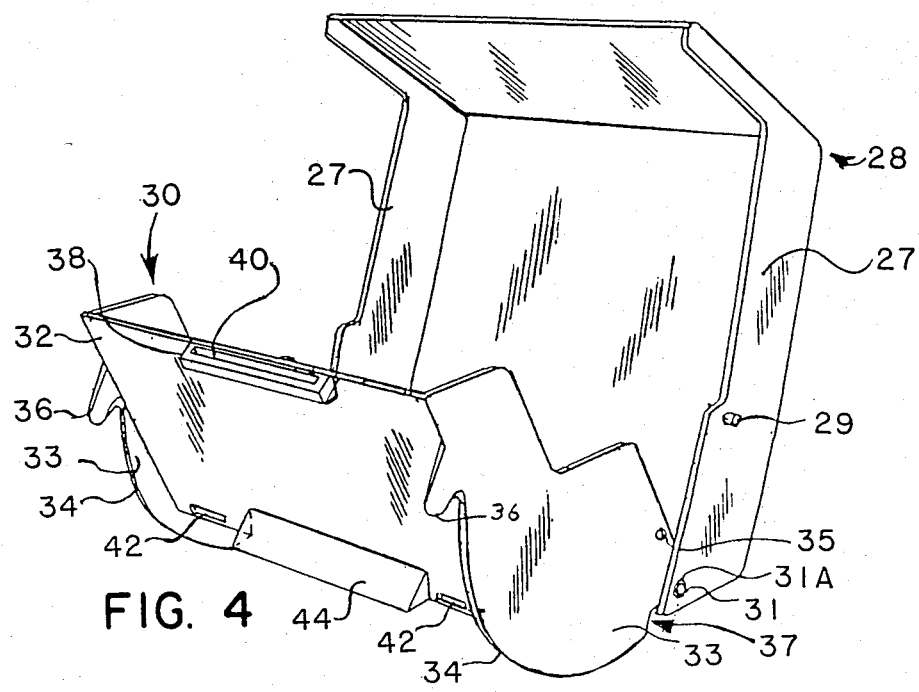
FIG. 4 is a perspective view showing the closure member and diskette support member disposed in a separated relationship from the base member.

Referring now to FIG. 4, the association of the closure member 28 and the diskette support member 30 is more clearly illustrated. It may be seem that the side walls 27 of closure member 28 include pivot pins 29 adapted to fit into the pivot apertures 16 of the base member side walls (FIGS. 2 and 3). The diskette support member 30 is pivotally attached to closure member 28 by pivot pins 31 formed in the upper rear portion of each side wall 27, and these pins are snapfitted into pivot apertures 31A formed in the bottom rear portion of the side walls 27 of the closure member 28. As will be further described below, a notch 37 formed at the rearmost extremity of the camming surface 34 of each diskette support side wall 33 is designed to ride over the cam 51 and permit a downward and forward motion of the diskette support member 30 when the closure member 28 has been rotated to a predetermined open position. This allows the diskettes stored therein (not shown) to be fanned forward providing ready access and permitting more easy identification of the diskette to be selected.

Figure 5:
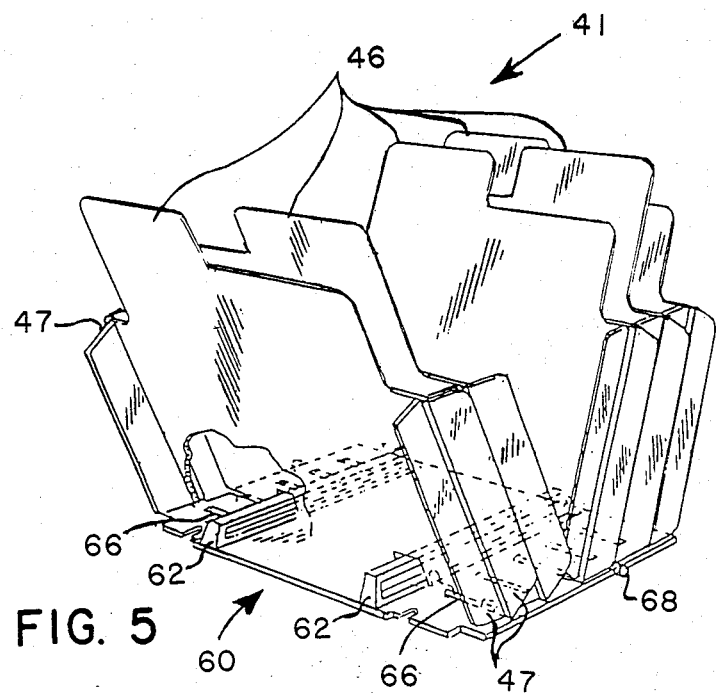
FIG. 5 is a perspective view showing the diskette support separator elements and the holding member.
Figure 6:
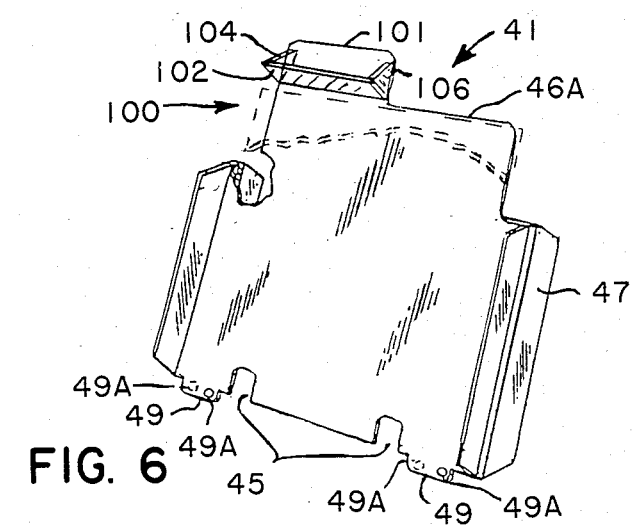
FIG. 6 is a perspective view showing one of the separator elements shown in FIGS. 2 and 5.
Figure 7:
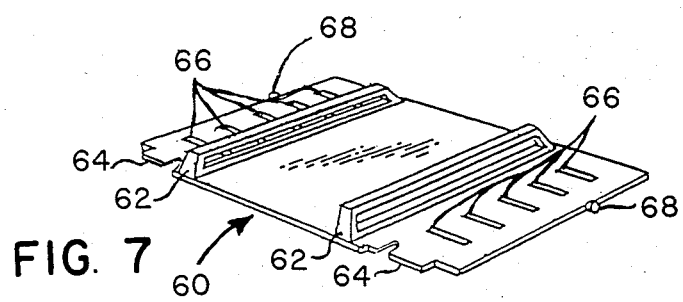
FIG. 7 is a perspective view showing the holding member of the subassembly shown in FIG. 5.

To provide compartmentalized storage, a holding means 60 is installed in the diskette support means 30, and such an arrangement including the separator elements 41 is illustrated in FIGS. 5, 6 and 7.

Referring to FIGS. 5 and 6, it may be seen that each of the separator elements 41 includes a tray portion 46 and side walls 47 which extend at right angles to the front and rear surfaces thereof. The forward extending side walls are positioned inwardly of the rearward extending side walls so that the adjacent separator elements nest as illustrated in FIG. 5 to form diskette storing pockets or compartments. In addition, the side walls prevent transverse motion of the diskettes during movement and opening and closing of the storage container. Guide rail engaging slots 45 at the bottom edge of each tray portion 46 fit over a guide rail 62 of the holding member 60, and in conjunction with separator tabs 49 and the tab slots 66 of holding member 60 cause the bottom end of each separator element 41 to be fixed in position but allowed to tilt along rails 66 so as to fan out for ease of storage and retrieval of floppy diskettes from the container.

Referring now to FIG. 7, the holding member 60 and its rails 62 and tab slots 66 are illustrated in more detail. When the holding member 60 is installed in the correct relation with respect to the diskette support member 30 (FIG. 4), the tabs 64 fit into tab slots 42 as shown in FIG. 4 and the forward ends of the guide rails 62 seat in the V-shaped depression 44 (FIG. 4). Pins 68 are positioned for insertion into apertures 35 provided in the side walls 33 of diskette support member 30 (FIG. 4) and in cooperation with tabs 64 and slots 42 lock member 60 in position relative to member 30.

Figure 8:
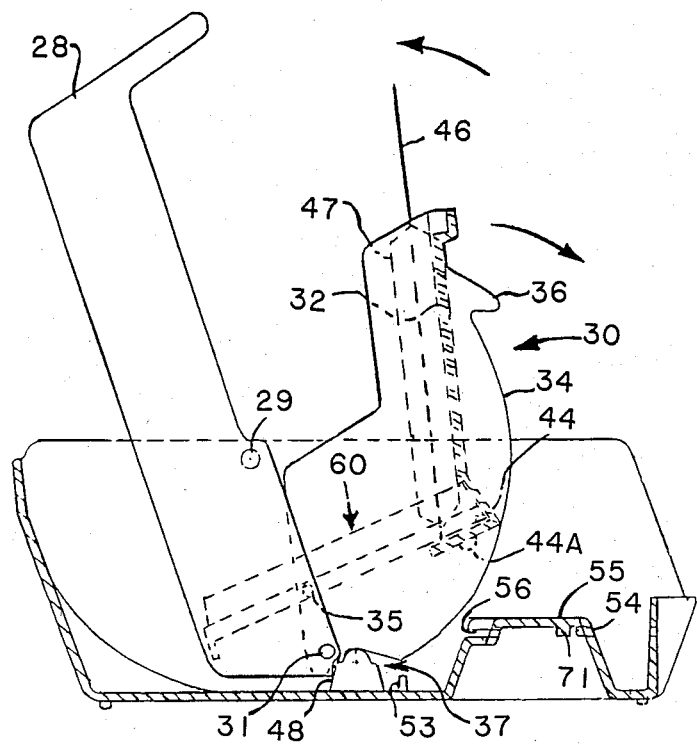
FIG. 8 is a sectional view taken along the line 8—8 of FIG. 2 to illustrate the operation of the container and the positioning of one separator element (46) and the holder (60)
Figure 9:
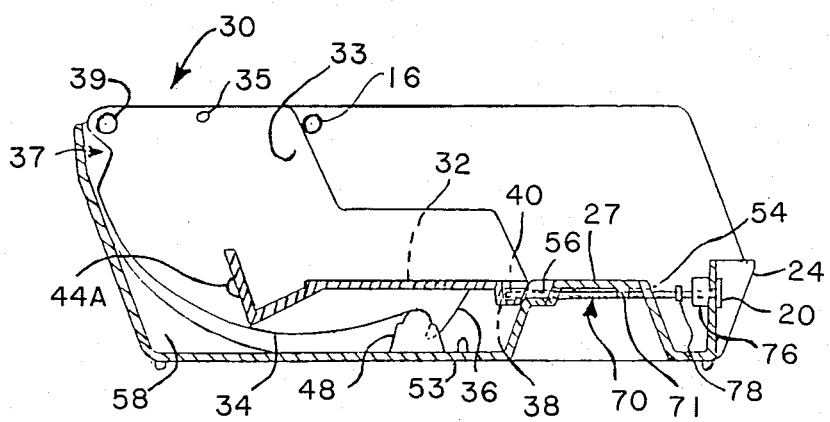
FIG. 9 is a sectional view of the container taken along the line 9—9 of FIG. 1 and illustrating how the diskette support member is locked by locking tabs (36) which extend into the front openings of the cam members (48) and the latch (70) which extends into the locking cavity (40)

The manner in which the various elements coact to provide a compact and effective storage arrangement for floppy diskettes may be seen with reference to FIGS. 8 and 9. In FIG. 8, the closure member is shown in its most open position. The bottom of the rear downward wall of closure member 28 is stopped against the back side of cams 48 which prevents further opening of closure member 28. The top counterclockwise arrow illustrates the direction of motion of the subassembly, consisting of closure member 28 and diskette support member 30 and its associated components, as the storage container is being opened. The mating of camming surfaces 34 with cam member 48 causes the diskette support member 30 to be lifted up and maintained in a predetermined, spaced relationship with closure member 28 until the cam notch portion 37 of camming surface 34 is reached. In FIG. 8, the cam member is in cam notch 37 and the view is taken just prior to the time when diskette support member 30 will fall forward and downward as shown by the clockwise arrow. A stop 53 limits the forward and downward motion which fans out the diskettes and gives greater access to the storage compartment areas. Only one separator element is shown and it should be noted that the tray 46 extends above the diskette support tray 32 and that the side walls 47 of separator element 41 have a length substantially the same as that of the tray portion of the diskette support member 30. Holding member 60 is shown in phantom where it is inserted in the V-shaped depression 44 and pivot pin 68 is installed in pivot aperture 35 of the side wall 33 of diskette support member 30.

In FIG. 9, the diskette support member 30 is shown in its closed position. Closure member 28 and the separator element 41 and holding member 60 are not shown in order to avoid drawing confusion. The pivot pin 39 at the upper rear of side 33 of diskette support member 30 is illustrated and this pivot pin fits into pivot aperture 31 as illustrated in FIG. 8. Locking arm 36 on the forward end of camming surface 34 is shown inserted in the locking position within the cam member 48. Note that the use of the locking arm 36 with the camming member 48 prevents removal of the diskette support system and the stored contents by the expedient of prying (popping) apart the pivotal elements at the rear of the storage container.

Figure 10:
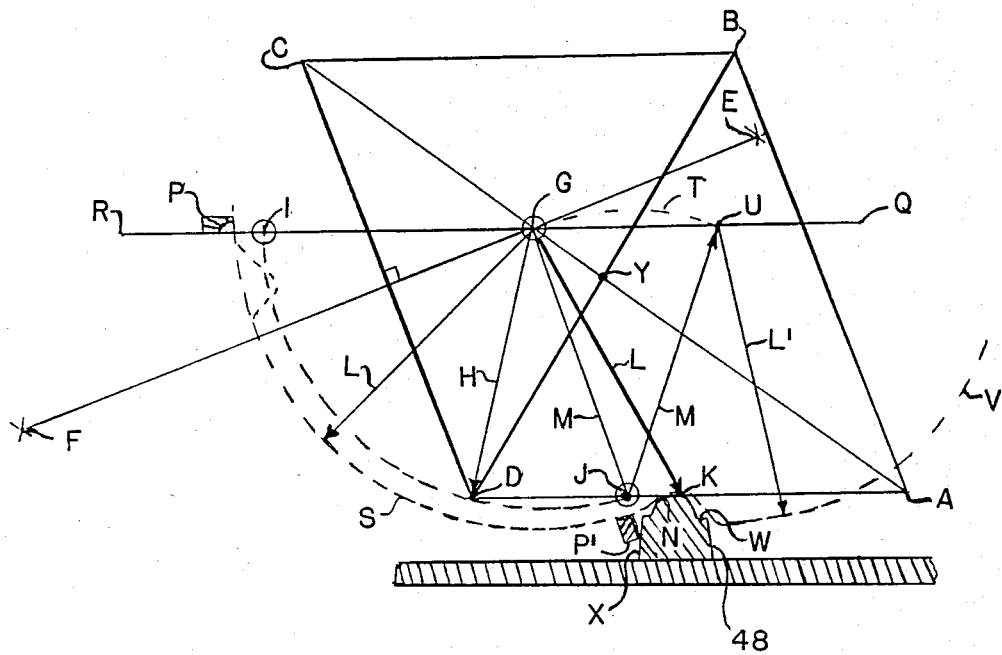
FIG. 10 is a generalized diagram illustrating the relationship of the pivotal connections, the camming surfaces and the cam-stop members for explaining design rules that should be followed in design thereof.

Referring to FIGS. 8, 9 and 10, the relationship of the pivotal connections, the camming surfaces and the cam-stop members can be more readily understood. Although actually shown in FIGS. 8 and 9, the generalized diagram of FIG. 10 is helpful in explaining the design rules that should be followed in designing a storage container for various quantity storage embodiments. If the diskettes to be stored may be contained in a volume represented in cross-section by the rectangle ABCD, then the various pivot points may be located as follows:

(1) bisect ABCD by drawing a line from A to C;
(2) bisect line CD with a line EF which is normal thereto, the intersection of EF and AC locating a first pivot point G.
(3) construct a horizontal line QR passing through point G;
(4) using the distance DG as a radius H, swing an arc intersecting QR at I, and AD at J thus defining secondary pivot points at I and J;
(5) select a point K between A and J along line AD to locate the forward extremity of a first cam surface N (member 48) defined by swinging an arc of radius L (line GK) about point G, such arc being continued in the clockwise direction to define a second cam surface S for sliding engagement with the cam N;
(6) using the line GJ to define a radius M and swing an arc T about point J to located a point U at the intersection of arc T and line OR;
(7) using the radius L located as shown at L', swing an arc V to locate the position of the cam surface S after point G has been moved to point U, such arc also defining a first stop surface W on the cam member 48; and
(8) a second stop surface X is located at the position P' of the rear edge P when the closure member 40 has been rotated into the full open position.

The center of mass or centroid of ABCD will be located at Y, FIG. 10, which is at the intersection of the diagonal line AC connected between points A and C and the diagonal line BD which is connected between B and D. As may be seen from the diagram, the above-described design rules for setting the relationship of the pivotal connections, the camming surfaces and the cam-stop members is effective in locating the centroid rearward of cam-stop 48, when the cover member is in the fully opened position. Thus, a rearwardly acting force will be applied to hold the cover member in the open position.

Figure 11:
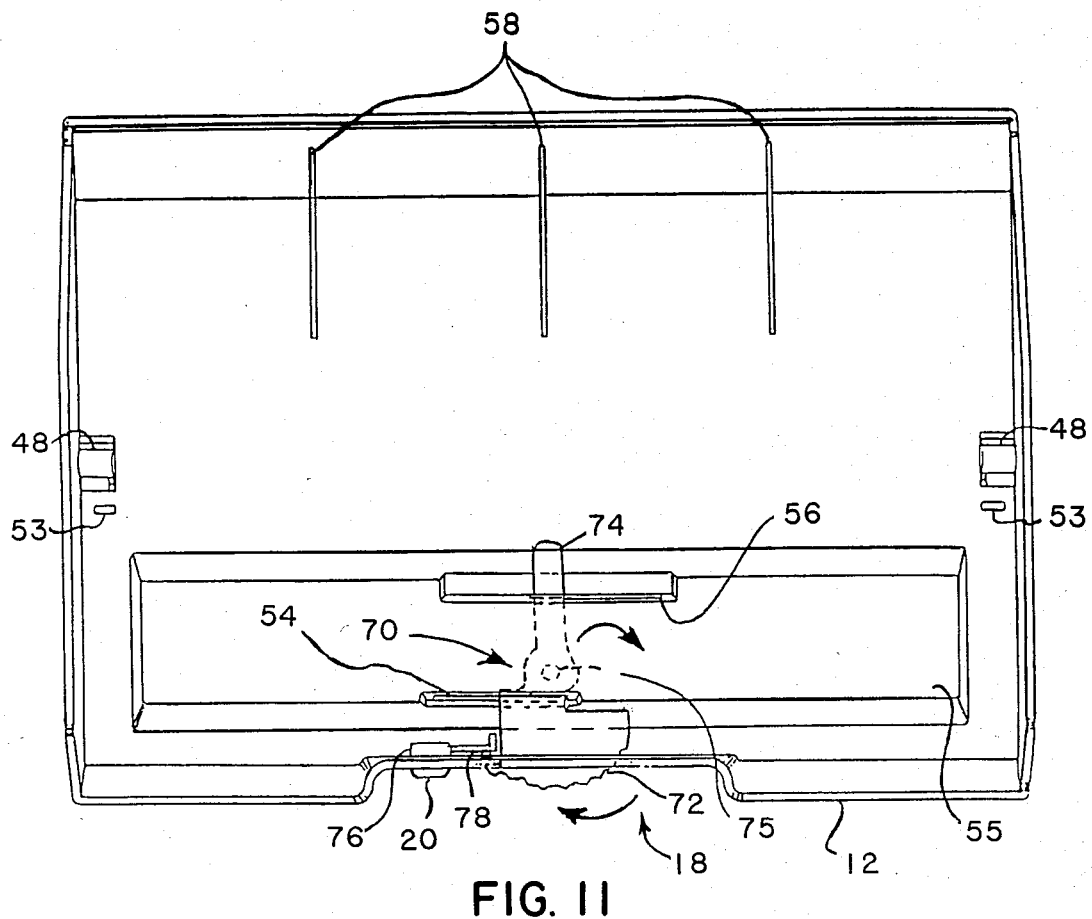
FIG. 11 is a top plain view of an alternative double wide base member illustrating the thumb-latch (70) and the locking mechanism accessible in the front recessed portion (18) of base member (12)

The latch member 70 prevents inadvertent opening of the closure member by locking the forward edge of the diskette support member 30. One end of the latch locking finger 74 extends from latch pivot 71 through aperture 56 and into locking slot 40. The other end of finger 74 extends into a thumb wheel portion 72 which is accessible via slot 22 at the front wall recess 18. Lock 20 can be operated by a key which causes rotating member 76 to move the locking element into position so as to prevent movement of the thumb latch once it is inserted in locking slot 40. Operation of the thumb wheel latch and locking member may be more clearly seen by referring to FIG. 11, in which a top view of the base element with closure and diskette support elements removed is shown.

Figure 12:
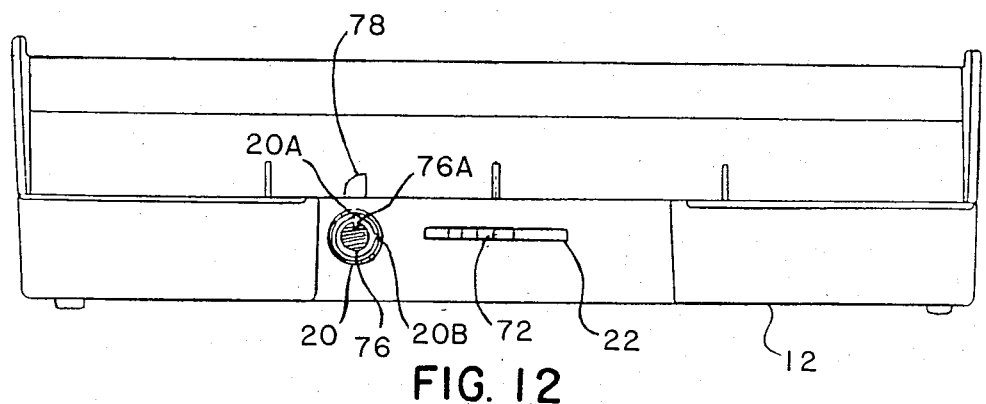
FIG. 12 is a front elevational view of the alternative double wide base member illustrating the key lock (20) and the front wall structure of base member (12)

Thumb wheel latch 70 has a thumb wheel like structure 72 attached at the end which extends through the slot 22 of the front wall recess of base member 12. A pivot aperture 75 is pivotally connected to latch pivot pin 71 and by moving the thumb wheel portion of the structure, the latch locking finger 74 can be moved to engage with or disengage from locking slot 40. As shown, the latch locking finger 74 is in the locking position and the lock rotating member 76 has been turned so that locking element 78 is adjacent a side of the thumb wheel type portion 72 of thumb wheel latch 70 so as to prevent clockwise motion. It is clear from the configuration of the slots 54 and 56 that when the latch is in the locking position, counterclockwise motion is limited by the sides of the slots 54 and 56 which are adjacent to the latch. FIG. 12 is a front view of the base member showing the recess including the lock aperture and lock and the thumb wheel slot in more detail.

Figure 13:
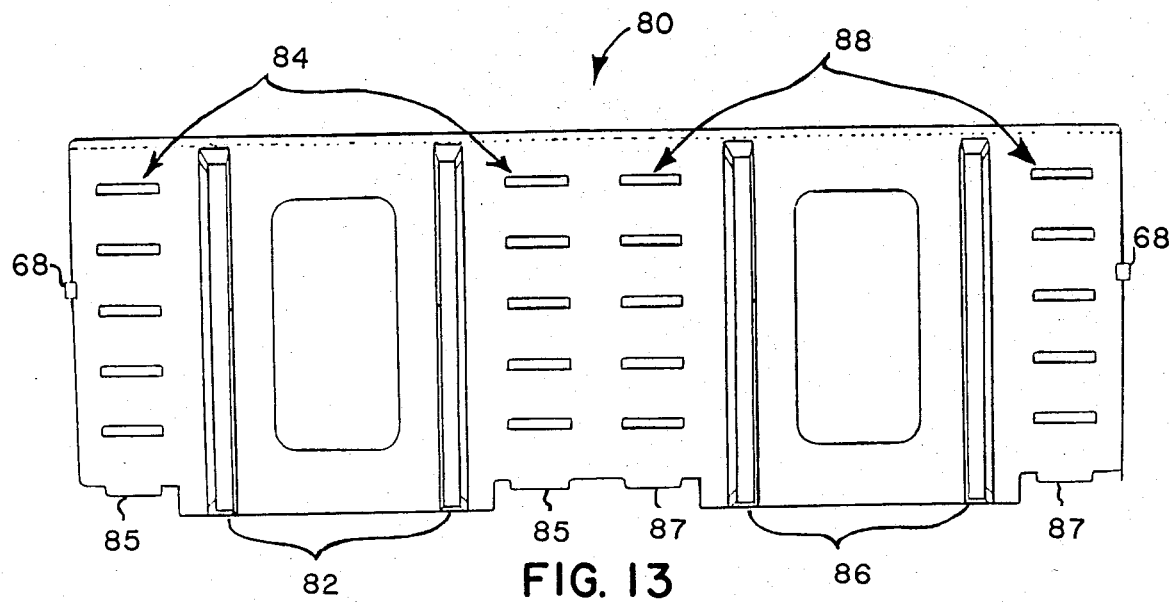
FIG. 13 is a top view of a double wide holder used in a double wide storage container.
Figure 14:
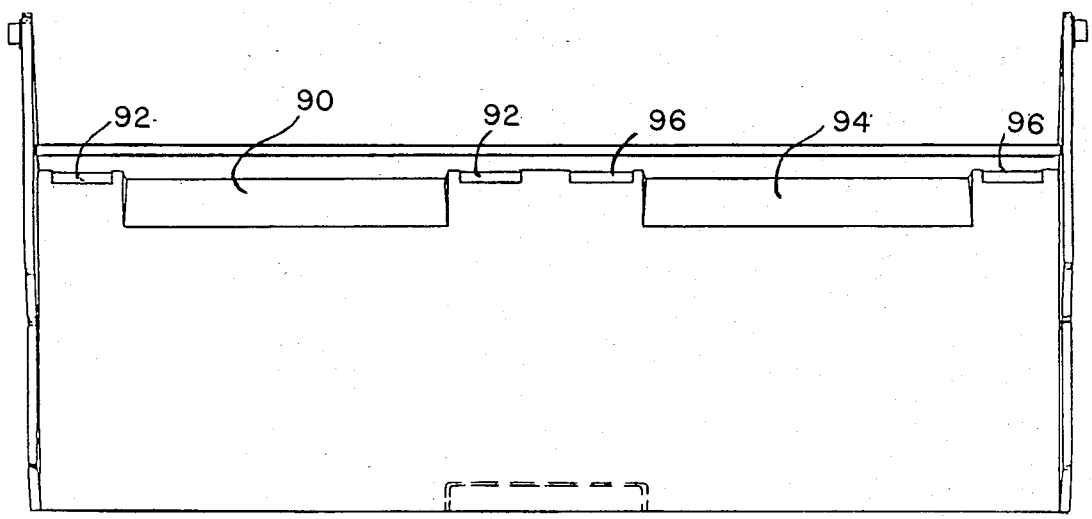
FIG. 14 is a top view of a double wide diskette support member illustrating the dual V-shaped depressions (90, 94) in which the rail ends (82, 86) of the double wide holder are inserted during assembly.

The structure as described hereinabove readily lends itself to an increase (doubling of) capacity by the expedient of extending the width of the base closure members and by forming the diskette support member and the holding member in a different manner. The manner in which the holding member is structured is shown in detail in FIG. 13 where it may be seen that a pair of holding members have been formed side by side to provide a double wide holding member 80 which includes a first pair of guide rails 82, a first set of separator guide slots 84 and a first pair of diskette support member tabs 85. A second set of guide rails 86 are formed on the same structure and associated therewith are a second set of separator element tab slots 88 and diskette support mounting tabs 87. The holding member 80 then fits in the diskette support member as shown in FIG. 14 in which the guide rails 82 and 86 match, respectively, with V-shaped depressions 90 and 94 with the tab slots 92 accepting the tabs 85 and the tab slots 96 accepting the tabs 87 of the associating holding member 80. Pivot pins 68 will be mounted in the side walls of the diskette support member in an arrangement which is similar to that shown in FIG. 8. The separator elements will be as shown in FIG. 6 and these will ride along their separate set of guide rails providing the compartmentalization in a side-by-side relationship so as to double the capacity of the storage container.

Although the present invention has been described herein, in terms of preferred embodiments thereof, it will be appreciated by those skilled in the art that alterations and modifications thereof may readily be made to suit particular needs and applications. It is therefore intended that the following claims be interpreted as covering all such alterations and modifications as fall within the true spirit and scope of the invention.

What is claimed is:

1. An improved storage container comprising:
    a generally rectangular base member having a means forming a bottom surface and four upturned walls forming an open top, and camming means disposed adjacent to two of said walls;
    a closure member attached to said base member by first pivot means having a portion configured to provide a closure for the open top of said base member with two downwardly turned side walls pivotally attached to corresponding walls of said base member; and
    a diskette support member having means forming a diskette support surface and a pair of side walls pivotally attached to the said side walls of said closure member by second pivot means and forming camming surfaces for engaging said camming means, said camming surfaces having a notch formed therein for receiving said camming means when said closure member has been rotated through a predetermined arc about said first pivot means thereby allowing said support member to rotate about said second pivot means away from said closure member.

2. A diskette storage container as set forth in claim 1 wherein said diskette support member comprises:
   a plurality of separator elements having one and other ends thereof for providing spaced apart compartments for storing diskettes; and
   holding means engaged with said support surface for providing guide apertures for accepting said one ends of said separator elements.

3. A diskette storage container as set forth in claim 2 wherein said support surface comprises:
   a tray like upper surface having formed at the back side thereof, a V-shaped depression adapted to engage with one end of said holding means and maintain said holding means in operating position; and
   cavity means for latching engagement with said base member.

4. A diskette storage container as set forth in claim 3 wherein said camming means comprises:
   a pair of side walls, a back wall and a top surface forming a smoothly curved camming surface at the outer top surface thereof and a hook shaped opening at the top forward interior surface thereof, said side walls being spaced apart to form a cam aperture at the forward edge thereof.

5. A diskette storage container as set forth in claim 4 wherein said camming surface further includes a locking arm near the forward edge and constructed so as to pass into said cam aperture and engage with said hook shaped opening when the container is closed.

6. A diskette storage container as set forth in claim 3 wherein said base member comprises:
   a front wall having a first aperture therein;
   a substantially rectangular raised portion adjacent said front wall; and having second and third apertures at the front and back walls thereof which mate with said first aperture;
   fastening means passing through said first, second and third apertures for engaging said cavity means; and
   means for locking said fastening means when engaged with said cavity means.

7. A diskette storage container as set forth in claim 6 wherein said fastening means comprises:
   a latch having a flat finger at one end thereof, having a thumb wheel type surface at the other end and having a pivot hole intermediate the ends.

8. A diskette storage container as set forth in claim 7 wherein said substantially rectangular portion includes a pivot pin formed in the underside of the top surface and aligned with said second and third apertures; said pivot pin adapted to mate with the pivot hole of said latch.

9. A diskette storage container as set forth in claim 8 wherein said first, second and third apertures are slots, said thumb wheel extends through said first slot to be accessible from the outside of said container, said slots being aligned with said pivot pin so as to permit engagement or non-engagement with said cavity means by external pressure applied to said thumb wheel type surface.

10. A diskette storage container as set forth in claim 9 wherein said cavity means is a slot positioned to accept said one end of said fastening means.

11. A diskette storage container as set forth in claim 10 wherein said base member further comprises:
   a locking member mounted in said front wall including a key hole for accepting a key, a rotating member responsive to a rotating movement of said key, and a bolt attached to said rotating member for positioning said bolt adjacent said bar whereby said fastening means may be locked.

12. A diskette storage container as set forth in claim 1 wherein each of said base member, closure member and diskette support member is double wide so as to accept two parallel sets of diskettes in a side-by-side arrangement, said diskette support member comprising:
   a first plurality of separators having one and other ends thereof, for providing a first series of spaced apart compartments for storing diskettes;
   a second plurality of separators adjacent said first plurality of separator, each having one and other ends thereof for providing a second series of spaced apart compartments for storing diskettes; and
   holding means engaged with said support surface for providing guide apertures for accepting said one ends of said separator elements.

13. A diskette storage container as set forth in claim 12 wherein said support surface comprises:
   a tray like upper surface having formed at the back side thereof, a pair of V-shaped depressions adapted to engage with one end of said holding means and maintaining said holding means in operating position; and
   at the front edge thereof, a cavity means formed on the bottom surface for latching engagement with said base member.

14. A diskette storage container as set forth in claim 13 wherein said camming means comprises:
   a pair of side walls, a back wall and a top surface forming a smoothly curved camming surface at the outer top surface thereof and a hook shaped opening at the top forward interior surface thereof, said side walls being spaced apart to form a cam aperture at the forward edge thereof.

15. A diskette storage container as set forth in in claim 14 wherein said camming surfaces further include a locking arm near the forward edge constructed so as to pass into said cam aperture and engage with said hook shaped inner surface when the container is closed.

16. A diskette storage container as set forth in claim 15 wherein said base member comprises:
   a front wall having a first aperture therein;
   a substantially rectangular raised portion adjacent said front wall, and having second and third apertures at the front and back walls thereof which mate with said first aperture;
   fastening means passing through said first, second and third apertures for engaging said cavity means; and
   means for locking said fastening means when engaged with said cavity means.

17. A diskette storage container as set forth in claim 16 wherein said fastening means comprises:
   a latch having a flat finger at one end thereof, having a thumb wheel type surface at the other end, and having a pivot hole intermediate the ends.

18. A diskette storage container as set forth in claim 17 wherein said substantially rectangular raised portion includes a pivot pin formed in the underside of the top surface and aligned with said second and third apertures, said pivot pin adapted to mate with the pivot hole of said latch.

19. A diskette storage container as set forth in claim 18 wherein said first, second and third apertures are slots, said thumb wheel extends through said first slot to be accessible from the outside of the container, said slots being aligned with said pivot pin so as to permit engagement or non-engagement with said cavity means by external pressure applied to said thumb wheel surface.

20. A diskette storage container as set forth in claim 19 wherein said cavity means is a slot positioned to accept said one end of said fastening means.

21. A diskette storage container as set forth in claim 20 wherein said base member further comprises:
a locking member mounted in said front wall including a key hole for accepting a key, a rotating member responsive to a rotating movement of said locking member, and a bolt attached to said rotating member for positioning said bolt adjacent said bar whereby said fastening means may be locked.

22. A diskette storage container as set forth in claim 1 wherein said first pivot means is disposed rearwardly of the centroid of said diskette support member.

23. A diskette storage container as set forth in claim 12 wherein said first pivot means is disposed rearwardly of the centroid of said diskette support member.

* * * * *